United States Patent [19]

Plenzler et al.

[11] Patent Number: 4,917,592
[45] Date of Patent: Apr. 17, 1990

[54] APPARATUS FOR APPLYING LABELS TO BLOW MOLDED ARTICLES

[75] Inventors: John A. Plenzler, Toledo, Ohio; Gerald L. Ames, Temperance, Mich.

[73] Assignee: Owens-Illinois Plastic Products, Inc., Toledo, Ohio

[21] Appl. No.: 175,803

[22] Filed: Mar. 31, 1988

[51] Int. Cl.<sup>4</sup> ............... B29C 49/24; B29C 49/04; B65C 9/14

[52] U.S. Cl. ............... 425/503; 156/DIG. 31; 264/509; 264/510; 264/515; 425/150; 425/516; 425/532; 425/538

[58] Field of Search ............ 425/503, 504, 515, 516, 425/113, 112, 116, 125, 126.1, 150, 155, 532, 538, 522; 264/509, 510, 511, 514, 515, 540, 132; 156/DIG. 31

[56] References Cited

U.S. PATENT DOCUMENTS

| | | | |
|---|---|---|---|
| 3,292,209 | 12/1966 | Borkmann | 425/126.1 |
| 4,479,770 | 10/1984 | Slat et al. | 425/504 |
| 4,479,771 | 10/1984 | Slat et al. | 425/503 |
| 4,498,854 | 2/1985 | Ross | 425/522 |
| 4,549,863 | 10/1985 | Bourgeois | 425/503 |
| 4,582,474 | 4/1986 | Ziegler | 425/503 |
| 4,636,166 | 1/1987 | Franks et al. | 264/509 |
| 4,729,731 | 3/1988 | Hasl et al. | 425/506 |

FOREIGN PATENT DOCUMENTS 2152424  8/1985  United Kingdom ............. 264/509

Primary Examiner—James C. Housel

[57] ABSTRACT

In the forming of an article by blow molding parisons into conformity with cavities of an array of mold sections wherein parisons in the form of tubes are extruded from an extruder into an array of neck molds on a head, the head is moved axially away from the extruder to define the parisons, mold sections are closed about the parisons, and the parisons are blown outwardly, an apparatus for application of labels to the hollow blown plastic articles which comprises an array of vacuum cups mounted on the head and movable with the head and a mechanism operable to move the vacuum cups outwardly to engage labels on magazines and move the labels inwardly toward the head and to thereafter move the labels outwardly and deposit them in the mold cavities when the head moves adjacent the mold cavities. Provision is made for moving the vacuum cups in a controlled slow manner upon removing the labels thereby obviating problems of removing multiple labels or damaging the labels when then are made of material such as plastic.

10 Claims, 4 Drawing Sheets

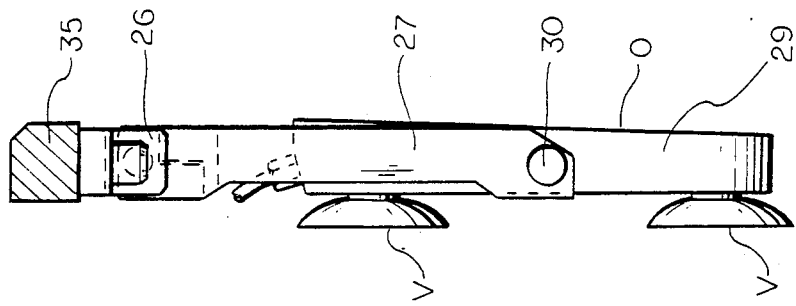
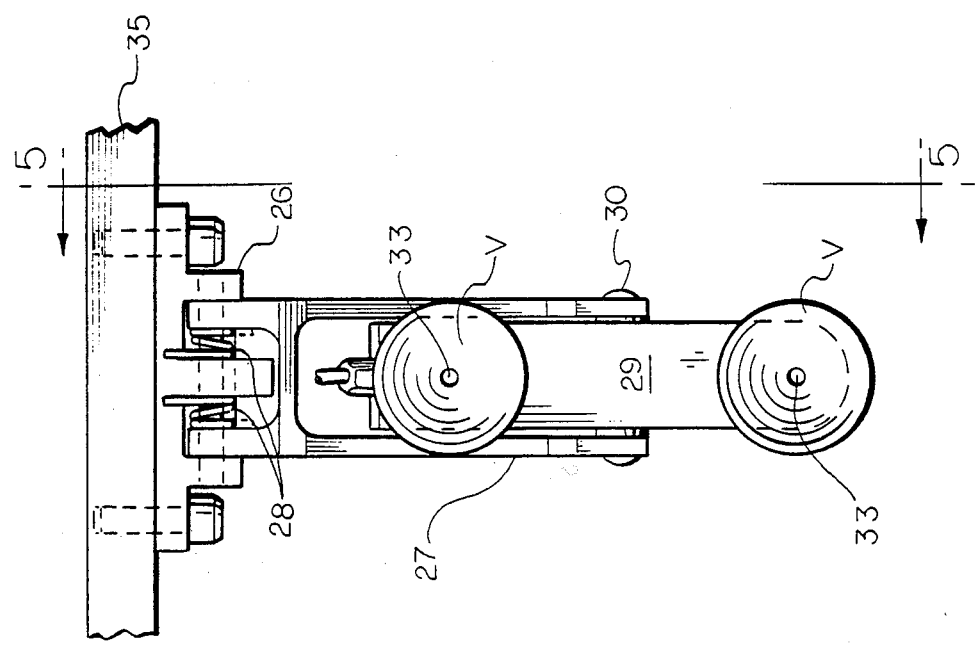
FIG. 5
FIG. 4

4,917,592

APPARATUS FOR APPLYING LABELS TO BLOW MOLDED ARTICLES

This invention relates to the application of labels and particularly the application of plastic labels to hollow blown plastic articles.

BACKGROUND AND SUMMARY OF THE INVENTION

In the making of hollow blown articles such as containers from plastic material, it has heretofore been suggested that labels be held in the cavities of mold sections by vacuum so that when parisons are blown outwardly into conformity with the cavities, the labels become adhered or bonded to the article.

In one type of apparatus, commonly known as injection-blow apparatus, parisons in the form of tubes are extruded from an extruder into neck molds on a head. The head includes label handling vacuum devices which remove labels from magazines and deposit the labels in the cavities of the mold sections.

When the labels are thin and made of plastic, one of the problems is that the vacuum devices tend to remove a plurality of labels at one time and another problem is that the labels can be easily damaged.

Accordingly, among the objectives of the present invention are to provide an in-mold labeling system which will obviate the problems of multiple labels and label damage where thin plastic labels are used.

In accordance with the invention, provision is made for moving the vacuum cups in a controlled slow manner upon removing the labels thereby obviating problems of removing multiple labels or damaging the labels when they are made of material such as plastic.

DESCRIPTION OF THE DRAWINGS

FIG. 4 is an end view on an enlarged scale of a portion of the apparatus.

FIG. 5 is a sectional view taken along the line 5—5 in FIG. 4.

DESCRIPTION

Figure 2:
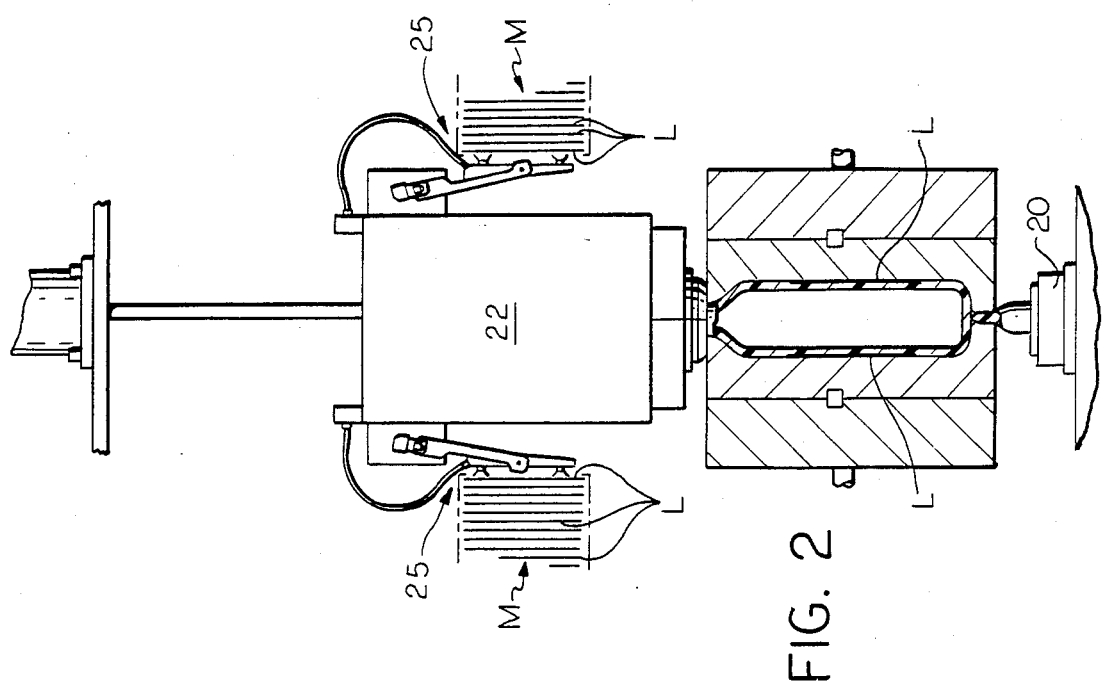
FIG. 2 is a view similar to FIG. 1 showing the parts in a different operative position.
Figure 1:
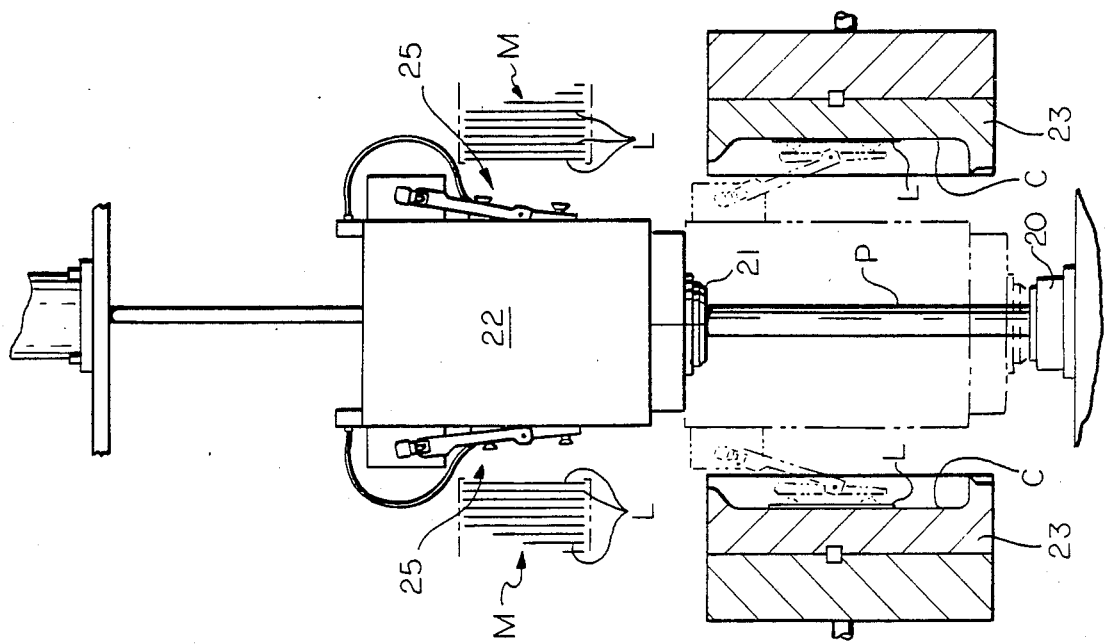
FIG. 1 is a fragmentary vertical sectional view of a conventional blow molding apparatus to which the invention is applied.
Figure 3:
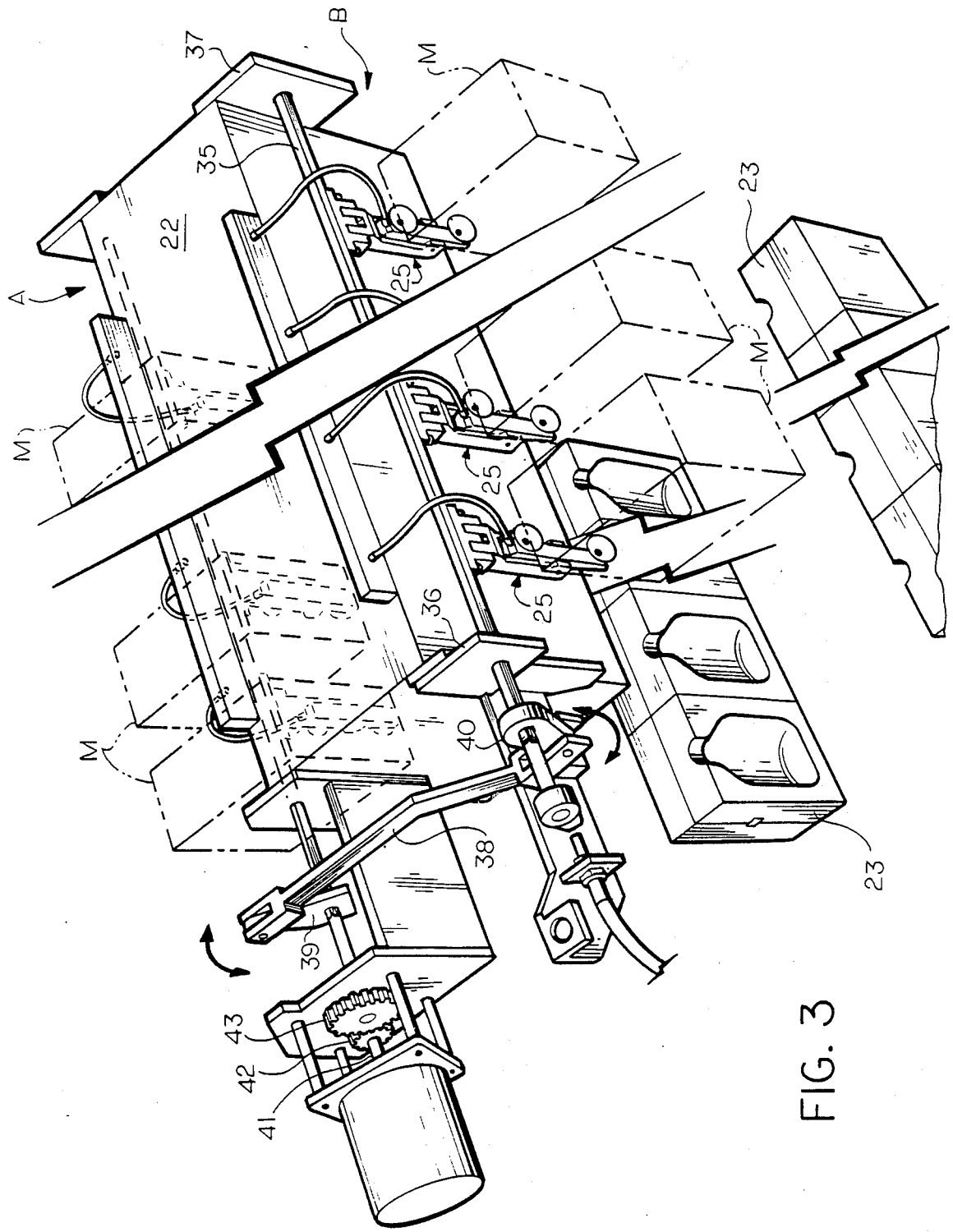
FIG. 3 is a fragmentary perspective view of the labeling apparatus.

Referring to FIGS. 1 and 2, in one type of blow molding apparatus, a plurality of parisons in the form of tubes are extruded from an extruder 20 into neck molds 21 on a head 22. As the extrusion continues, the head 22 is moved upwardly relative to the extruder 20 to define parisons P. Mold sections 23 define an array of cavities C which are then closed about the parisons and the parisons are blown outwardly to form hollow articles such as containers. If labels are applied to the cavities of the mold sections before they are closed, the labels become adhered or bonded to the hollow blown article that is formed.

Two arrays of label pickup devices 25 supporting vacuum cups V, as presently described, are provided on the head 20 for movement relative to the head such that the vacuum cups V can be moved outwardly relative to the head 20 to remove the labels L from magazines M; thereafter inwardly in order that the head may be moved downwardly between the mold sections; whereupon once again the vacuum devices can be moved outwardly to deposit the labels in the mold cavities C where vacuum in the mold cavities holds the labels until the mold sections 23 are closed and the parisons P are expanded to define hollow articles.

In accordance with the invention, provision is made for controlling the speed of movement of the vacuum devices. It has been found that if the vacuum devices are moved to engage the labels in the magazines and thereafter slowly moved away from the magazines, the problems of removing multiple plastic labels from the magazines or damaging the plastic labels are obviated. However, in order to efficiently produce containers in the shortest possible time, provision is also made for moving the label pickup devices rapidly outwardly to deposit the labels into the mold cavities C.

Referring to FIGS. 3–6, each vacuum pickup device 25 comprises a vacuum cup arm assembly comprising a bracket 26, a pivot yoke 27 pivoted to the bracket 26 by a shaft 27a and yieldingly urged to a vertical position by coil springs 28 on shaft 27a having their ends engaging the bracket 26 and the yoke 27, respectively. A vacuum cup block 29 is pivoted intermediate its ends on yoke 27 by a pin 30 and supports the vertically spaced vacuum cups V.

Each vacuum cup block 29 includes a vacuum inlet 31 which communicates with a longitudinally extending passage 32 that extends to transverse passages 33 in the vacuum cups V.

Each array of vacuum cup arm assemblies 25 is mounted on a shaft 35 that is rotatably mounted on brackets 36, 37 mounted on the side of head 20. The two shafts 35 and the two arrays are interconnected by a connecting link 38 that is pivoted to lever arms 39, 40 that are fixed on the respective shafts 35.

In accordance with the invention, a stepping motor S is mounted on a bracket and has an output shaft 41 supporting a gear 42 meshing with a gear 43 fixed on one of the shafts 35. The motor is operated in accordance with the invention at different speeds during different portions of the cycle.

At the time that the vacuum cups V are in position adjacent the magazines M, the stepping motor is operated at a high speed to bring the vacuum cups V into engagement with the labels L and then reversed and operated at a lower speed sufficient that only a single label L will be removed from each magazine M and that the labels will not become damaged.

When the head 22 with the array of vacuum pickup assemblies 25 thereon is moved between the open mold sections 23, the stepping motors are operated at a high speed to rapidly move the labels L within the mold cavities C and deposit them therein. The label pick-up devices must move fast after the label has been deposited in the cavities to minimize total cycle time.

The pivoting of the vacuum cup blocks on the pivot yoke 27 permit the vacuum cups V to move and align with the stack of labels L in the magazines M and with the base of the cavities C in the mold sections. The pivoting of the yoke 27 on the brackets 26 together with the springs 28 permit the vacuum blocks 26 on one side of head 22 to engage the magazines or cavities before the vacuum blocks 26 on the other side thereby obviating the need to precisely locate the various parts relative to one another.

The overtravel of the mechanism on side B (FIG. 3) permits the mechanism on side A to come into contact with the mold cavities or magazines on side A before the mechanism on side B contacts the cavities or magazines. This permits one stepping motor to drive both the side A and B mechanisms and guarantees that the label pick-up devices will all make contact with all the labels in the magazines and all the mold cavities. This overtravel combined with the springs on the yoke permit some lost motion of the vacuum blocks relative to each other.

Figure 6:
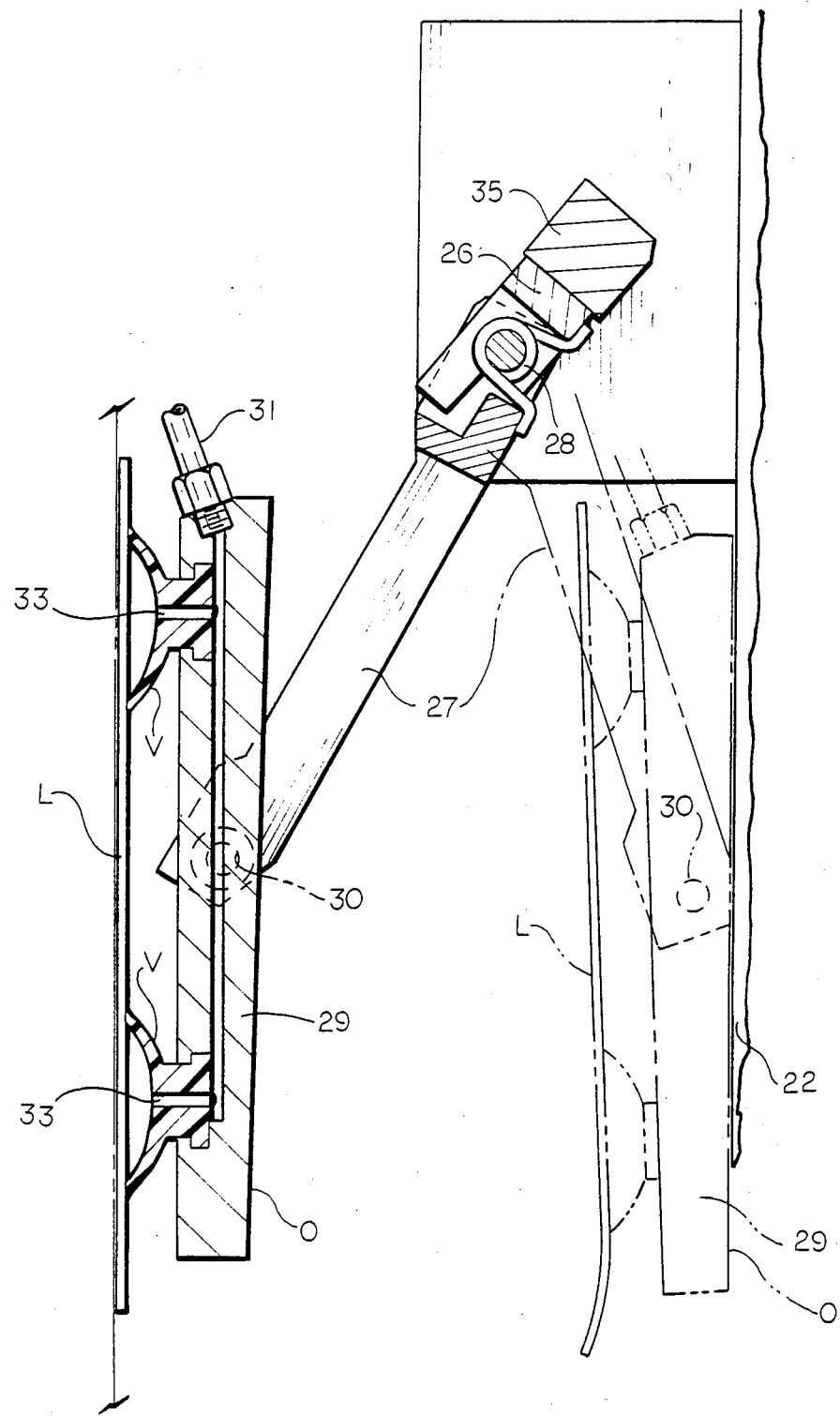
FIG. 6 is a sectional view taken along the line 6—6 in FIG. 4.

As shown in FIGS. 5 and 6, the outer surfaces 0 on the vacuum blocks are provided with a taper that extends axially downwardly and inwardly toward the vertical axis of head 22 in order that there will be an effective label clearance with respect to the mold 23. More specifically, when the arms 29 are in the transfer position, shown in broken lines in FIG. 6, the surface 0 contacts the head 22 tilting the label L downwardly and inwardly relative to the head 22 such that the label L clears the mold.

In a typical example, the operating speeds for plastic labels are as follows:

| Head 22 is up | vacuum pick up assemblies 25 out | 20,000 steps/sec for 450 steps |
|---|---|---|
| (Picking label) | vacuum pick up assemblies 25 back with labels | 25 steps/sec for 400 steps, then at 1000 steps per sec for 50 steps |
| Head 22 down | vacuum pick up assemblies 25 out | 2,000 steps/sec for 600 steps |
| (Placing label) | vacuum pick up assemblies 25 back | 20,000 steps/sec for 600 steps |

It can thus be seen that there has been provided a method and apparatus for supplying plastic labels which obviates the problems of the prior art, namely, the problem of multiple labels being removed from the magazines and damage to the labels when they are made of plastic. The use of a stepping motor permits a wide choice of exactly controlled speeds to be selected to accommodate the physical characteristics of any label.

We claim:

1. In an apparatus for forming hollow articles by blow molding parisons into conformity with cavities of an array of mold sections wherein parisons in the form of tubes are extruded from an extruder into an array of neck molds on a head and the head is moved axially away from the extruder to define the parisons and the mold sections are closed about the parisons and the parisons are blown outwardly, and an apparatus for applying labels to the hollow blow plastic articles, the improvement comprising
    an array of vacuum devices,
    means for supporting said array of vacuum devices on said head for movement toward sources of plastic labels when the head is in position adjacent the sources and for movement toward the cavities of the mold sections when the head is adjacent the mold cavities, and
    means for moving said array of vacuum devices into engagement with sources of plastic labels, slowly removing the vacuum devices away from the sources, and thereafter moving the array of vacuum devices between the mold sections, and rapidly moving the devices into the cavities to deliver an array of labels to the cavities,
    said means for moving said vacuum devices comprising a stepping motor,
    said means for supporting said vacuum devices comprising a shaft having a longitudinal axis, means for mounting said shaft on said head for rotation along said axis, each vacuum device comprises a yoke pivoted on said shaft, and a vacuum block pivoted intermediate its ends on said yoke.

2. The apparatus set forth in claim 1 including spring means operable to urge each said yoke in one direction relative to said shaft.

3. The apparatus set forth in claim 2 wherein each said spring means comprises a coil spring.

4. The apparatus set forth in claim 1 wherein each said vacuum block includes a tapered surface which engages the head during transfer causing the label to extend downwardly and inwardly relative to the head and thereby provide proper clearance with respect to the mold.

5. In an apparatus for forming hollow articles by blow molding parisons into conformity with cavities of an array of mold sections wherein parisons in the form of tubes are extruded from an extruder into an array of neck molds on a head and the head is moved axially away from the extruder to define the parisons and the mold sections are closed about the parisons and the parisons are blow outwardly, and an apparatus for applying labels to the hollow blow plastic articles, the improvement comprising
    a first array of vacuum devices,
    means for supporting said first array of vacuum devices on said head for movement toward sources of plastic labels when the head is in position adjacent the sources and for movement toward the cavities of the mold sections when the head is adjacent the mold cavities, and
    means for moving said first array of vacuum devices into engagement with sources of plastic labels, slowly removing the vacuum devices away from the sources, and thereafter moving the first array of vacuum devices between the mold sections, and rapidly moving the devices into the cavities to deliver an array of labels to the cavities,
    a second array of vacuum devices, and means for supporting said second array of vacuum devices on said head for movement toward a second source of labels when the head is in position adjacent the sources and for movement toward the cavities of the mold sections when the head is adjacent the mold cavities, and means interconnecting said first and second arrays of vacuum devices for substantially simultaneous movement,
    said means for supporting said second array of vacuum devices comprising a shaft having a longitudinal axis means for mounting said shaft on said head for rotation along said axis, each vacuum device comprises a yoke pivoted on said shaft, and a vacuum block pivoted intermediate its ends on said yoke.

6. The apparatus as set forth in claim 5 including spring means operable to urge each said yoke in one direction relative to said shaft.

7. The apparatus set forth in claim 6 wherein each said spring means comprises a coil spring.

8. In an apparatus for forming hollow particles by blow molding parisons into conformity with cavities of an array of mold sections wherein parisons in the form of tubes are extruded from an extruder into an array of neck molds on a head and the head is moved axially away from the extruder to define the parisons and the mold sections are closed about the parisons and the parisons are blow outwardly, and an apparatus for applying labels to the hollow blow plastic articles, the improvement comprising a first array of vacuum devices, means for supporting said array of vacuum devices on said head for movement toward source of plastic labels when the head is in position adjacent the sources and for movement toward the cavities of the mold sections when the head is adjacent the mold cavities, and means for moving said array of vacuum devices into engagement with sources of plastic labels, slowly removing the vacuum devices away from the sources, and thereafter moving the array of vacuum devices between the mold sections, and rapidly moving the devices into the cavities to deliver an array of labels to the cavities, said means being operable to remove said vacuum devices at a speed substantially slower than the speed of movement of said vacuum devices toward said sources of labels and slower than the speed of movement of said vacuum devices toward and away from said cavities, said means for moving said vacuum devices comprising a stepping motor, said means for supporting said vacuum devices comprising a shaft having a longitudinal axis, means for mounting said shaft on said head for rotation along said axis, each vacuum device comprises a yoke pivoted on said shaft, and a vacuum block pivoted intermediate its ends of said yoke.

9. The apparatus set forth in claim 8 including a second array of vacuum devices, and means for supporting said second array of vacuum devices on said head for movement toward a second source of labels when the head is in position adjacent the sources and for movement toward the cavities of the mold sections when the head is adjacent the mold cavities, and means interconnecting said first and second array for substantially simultaneous movement.

10. The apparatus set forth in claim 9 wherein said means for supporting said second array of vacuum devices comprises a second shaft having a longitudinal axis, means for mounting said second shaft on said head for rotation along said axis, each vacuum device of said second array comprises a second yoke pivoted on said second shaft, and a second vacuum block pivoted intermediate its ends on said second yoke.

* * * * *